(12) United States Patent
Carter et al.

(10) Patent No.: US 8,954,379 B2
(45) Date of Patent: *Feb. 10, 2015

(54) HOSTED SYSTEM FOR ENABLING ENTERPRISES TO BUILD AND OPERATE ONLINE COMMUNITIES

(75) Inventors: David K. R. Carter, Carlisle (CA); Robin A. Hopper, Oakville (CA)

(73) Assignee: Surfmap, Inc., Burlington (CA)

( * ) Notice: Subject to any disclaimer, the term of this patent is extended or adjusted under 35 U.S.C. 154(b) by 143 days.

This patent is subject to a terminal disclaimer.

(21) Appl. No.: 13/355,761

(22) Filed: Jan. 23, 2012

(65) Prior Publication Data

US 2012/0191644 A1    Jul. 26, 2012

Related U.S. Application Data

(63) Continuation of application No. 12/147,892, filed on Jun. 27, 2008, now Pat. No. 8,103,618.

(51) Int. Cl.
*G06F 17/30* (2006.01)

(52) U.S. Cl.
CPC ...... *G06F 17/30867* (2013.01); *G06F 17/3089* (2013.01)
USPC .......................................................... 707/608

(58) Field of Classification Search
CPC .......... G06F 17/3087; G06F 17/30283; G06F 17/30448; G06F 17/30401; G06F 17/30734
USPC .......................................................... 707/608
See application file for complete search history.

(56) References Cited

U.S. PATENT DOCUMENTS

| 5,983,203 | A * | 11/1999 | Church et al. | 705/35 |
| 6,947,903 | B1 * | 9/2005 | Perry | 705/28 |
| 6,996,670 | B2 * | 2/2006 | Delaire et al. | 711/114 |
| 7,099,561 | B1 * | 8/2006 | Lin et al. | 386/241 |
| 8,010,622 | B2 * | 8/2011 | Dolan | 709/217 |
| 8,442,943 | B2 * | 5/2013 | Multer et al. | 707/621 |
| 2001/0039574 | A1 * | 11/2001 | Cowan et al. | 709/223 |
| 2004/0019637 | A1 * | 1/2004 | Goodman et al. | 709/204 |
| 2008/0065406 | A1 * | 3/2008 | Adelman et al. | 705/1 |
| 2009/0300139 | A1 * | 12/2009 | Shoemaker et al. | 709/217 |

* cited by examiner

*Primary Examiner* — Hosain Alam
*Assistant Examiner* — Ahmed Abraham
(74) *Attorney, Agent, or Firm* — David H. Judson (57) ABSTRACT

A system to design, create integrate and operate online communities uses web-based participation technologies. Any content can have attributes that make it appear as any type of content. With this uniform content architecture, all user-generated content is treated as a post (or, more generally, a submission), and there is no need for a participant to author multiple entries for separate uses. Preferably, content created or otherwise associated with a particular author is intrinsically tied to the author via the author's profile. At each point of participation, the content is associated with the individual, which allows the system to build and maintain a rich "living" profile for each community member. Using this approach, the system can build and enable querying of so-called "social aggregations," which are data sets that describe a relationship among one or more author attributes and one or more content attributes.

6 Claims, 9 Drawing Sheets

HOSTED SYSTEM FOR ENABLING ENTERPRISES TO BUILD AND OPERATE ONLINE COMMUNITIES

This application is a continuation of Ser. No. 12/147,892, filed Jun. 27, 2008.

BACKGROUND OF THE INVENTION

1. Technical Field

This disclosure relates generally to a system for organizing, managing and leveraging user-generated content (UGC) within and across a business enterprise.

2. Background of the Related Art

Web 2.0-based content comes in many forms, from blogs, wikis, social networks, images, podcasts, RSS feeds, and the like. As business enterprises allow their employees, customers, prospects and partners to generate content, enterprise administrators must find a way to manage all of this disparate content, while at the same time ensuring that enterprise systems include appropriate controls to ensure adherence to corporate standards, codes of conduct, and quality. Most enterprises, however, do not have the resources or experience in designing, creating and operating online communities. For example, how one enterprise designs a community and manages user participation may not work well for some other enterprise. Moreover, different enterprises are likely to have different goals in enabling online communities, as well as different security and information gathering/dissemination requirements. Further, online communities tend to be content specific; thus, an enterprise might enable one set of employees to set up and participate in a wiki while another set of employees participates in a social network. Content typically is not easily shared across these various forms of social media.

BRIEF SUMMARY OF THE INVENTION

The subject matter herein relates generally to a system that enables enterprises to design, create integrate and operate online communities. Preferably, the system operates as an on-demand hosted platform (software-as-a-service) that provides a secure and reliable architecture on which enterprises can safely and securely develop, execute and manage their online communities. These online communities enable enterprise customers, prospects, employees, or partners connect with each other and share content.

Preferably, the system is implemented as an on-demand social media platform that combines a wide range of web-based participation technologies (e.g., blogs, wikis, discussion groups, social networking, podcasts, RSS, tagging, photos, videos, mapping, and the like) with enterprise-level security, control, and content moderation. Any content can have attributes that make it appear as any type of content, e.g., a blog post, user-generated content in a community, a discussion forum topic, a wiki, an event, a photo album, a bookmark, or a point on a map. Content is managed within the platform in a uniform fashion. Preferably, user-generated content is captured in a profile-rich manner in the sense that the content is stored (or otherwise associated with) profile information about the user who generated it. This allows the platform to gather content in one participation technology and to share it in a second one, while retaining the context of the author who generated the content. Thus, for example, a blog entry can be gathered and then re-purposed as an entry in a wiki, or an email can be received and automatically shared as a blog entry. This uniform approach maximizes the value of user-generated content and allows the enterprise to provide a flexible participation experience for a community member.

With a uniform content architecture, all user-generated content is treated as a post (or, more generally, a submission), and there is no need for a participant to author multiple entries for separate uses. The participant simply authors content and then further defines it by applying one or more attributes that the system then uses to transform the post into any combination of one or more of the following participation experiences: a blog, a wiki, a discussion forum, a photo album/blog, a video album/blog (or tag clouds), a podcast or videocast, a calendar entry, or the like. This feature enables a community to gather information from multiple participation points (such as by blogging/posting to the system, by emailing content to the system, by context-specific quick post forms, by bookmarking, by RSS feeds, or by any other mechanism) without individual users having to concern themselves with where they can create content or from where such content might be viewed by others. Moreover, preferably all content created or otherwise associated with a particular author is intrinsically tied or "linked" to the author via the author's profile. Thus, at each point of participation, the content is associated with the individual, which allows the system to build and maintain a rich "living" profile for each community member. Using this approach, the system can build and enable querying of so-called "social aggregations," which are data sets that describe a relationship among one or more author attributes and one or more content attributes.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
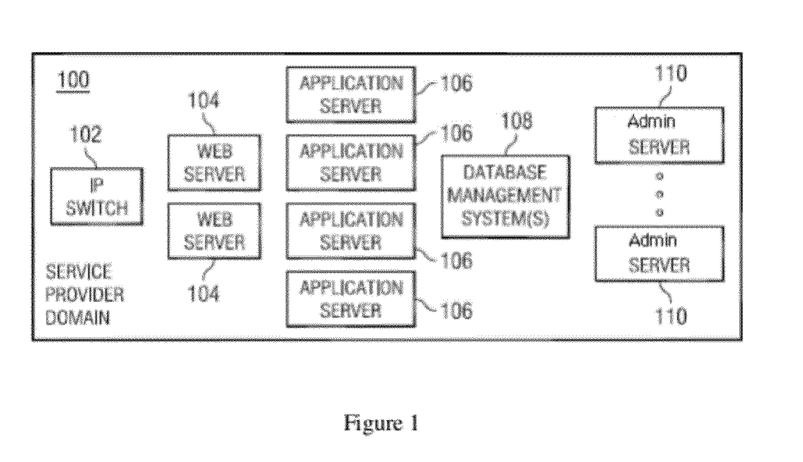
FIG. 1 is a simplified block diagram of a system architecture in which the hosted platform may be implemented according to one embodiment.

FIG. 1 illustrates a representative service provider or system architecture, which in the preferred embodiment is implemented in or across one or more data centers. A data center typically has connectivity to the Internet. In one embodiment, the system provides a web-based hosted solution through which enterprises build and operate online "communities." An "enterprise" typically is a business organization (such as a corporation or an operating division thereof) that leases or otherwise obtains access to the system, typically on a subscription basis. Thus, in a representative embodiment, an enterprise enters into a service agreement with the service provider to obtain access to one or more functionalities exposed by the system. The system operator (the service provider) makes the hosted platform available to one or more enterprise customers, who use the platform to build and manage online communities by which enable enterprise customers, prospects, employees, or partners connect with each other and share content. As will be described below, the system is implemented as on-demand social media platform that combines a full range of so-called Web 2.0 technologies (e.g., blogs, wikis, discussion groups, social networking, podcasts, RSS, tagging, photos, videos, mapping, and the like) with enterprise-level security, control, and content moderation. End users preferably interact with the platform as a hosted service, although in an alternative embodiment the system may be implemented over a private network, or as a product (as opposed to a hosted or managed service). The system enables enterprises to build brand loyalty, generate revenue, drive new forms of marketing, improve collaboration, encourage knowledge-sharing, and build corporate identity.

The services provided by the hosted platform may also be exposed on public web sites. Thus, for example, a customer of the service may provide a publicly-accessible web site in the usual manner and include one or more Web 2.0 technologies (e.g., blogs, wikis, discussion groups, social networks, podcasts, RSS feeds, etc.) using the techniques described herein. Those technologies may be exposed as separate pages within the larger site, or they may be located within a given page or pages.

An end user of the service (e.g., an enterprise employee or authorized customer, prospect or partner) has an Internet-accessible machine such as a workstation, notebook or mobile device. Typically, the user accesses the service provider architecture by opening a web browser on the machine to a URL associated with a service provider domain or subdomain. The user then authenticates to the managed service in the usual manner, e.g., by entry of a username and password. The connection between the machine and the service provider infrastructure may be encrypted or otherwise secure, e.g., via SSL, or the like. Although connectivity via the publicly-routed Internet is typical, the user may connect to the service provider infrastructure over any local area, wide area, wireless, wired, private or other dedicated network. As seen in FIG. 1, the service provider architecture 100 comprises an IP switch 102, a set of one or more web server machines 104, a set of one more application server machines 106, a database management system and repository 108, and a set of one or more administration server machines 110. A representative web server machine 104 comprises commodity hardware (e.g., Intel-based), an operating system such as Linux, and a web server such as Apache 2.x. A representative application server machine 106 comprises commodity hardware, Linux, and an application server. The database management system and repository 108 may be implemented as an Oracle database management package. In a high volume use environment, there may be several web server machines, several application server machines, and a number of administrative server machines. Although not shown in detail, the infrastructure may include a firewall, a name service, other load balancing appliances, caches, other switches, network attached storage, and the like. The system typically will also include connectivity to external data sources, such as third party databases. Each machine in the system typically comprises sufficient disk and memory, as well as input and output devices. Generally, the web servers 104 handle incoming requests and provide responses in the usual form, e.g., web pages, RSS feeds, blogs, and the like. The application servers 106 manage the data and facilitate the functions of the platform. The administrator servers 110 handle all back-end accounting and reporting functions. The particular hardware and software implementation details described herein are merely for illustrative purposes are not meant to limit the scope of the described subject matter. The platform requests any data required from the database servers and combines such data with an appropriate template to present the content to a requesting end user. Typically, the template is a web page, a blog page, an RSS feed, or any variety of other content modalities.

Communities are often thought of as being "internal" or "external." While some communities may be limited to just employees or customers, prospects, and partners, the most powerful ones combine a mix of members into a single community of interest. Often, communities that start as only "internal" or "external" evolve to combine members from both audiences, and most companies usually have a combination of different types of communities. In such communities, it is usually not appropriate for every member to have the same privileges and permissions. Rather, it is often desirable to control which members can read, post, edit, or comment on particular categories of content. For example, a community for employees might allow selected partners to participate, but the partners should not be able read confidential information about corporate performance or customers. As another example, a community for R&D and product managers might allow key customers to contribute, but only customers using a particular product should be able to engage in discussions around that product's future. As yet another example, a community where customers collaborate around product issues may include subject matter experts from the manufacturer, but only the product managers should be able to post content to a "new product announcements" category. Of course, these are just representative examples.

The hosted platform described above takes a holistic view of communities and provides enterprises with the ability to create communities that mix internal and external audiences. As will be described, the platform provides enterprise security to segment users with different permissions and privileges. Moreover, the platform provides both manual and automated moderation tools to ensure that content provided to the platform is acceptable. The platform also enables multiple authentication methods (e.g., single sign on, identity management, password, and so on) to be enforced for different audiences. Preferably, communities combine one or more areas of capability, including user-generated content (blogs, wikis, discussions, photos, videos, voting, etc.), social networking (members finding members), profiles, and enterprise security and control. These areas work together in a unique manner that provides significant advantages. In general, and as will be described in more detail below, a member can find a piece of content (e.g., a blog post, a discussion reply) that has value and then quickly determine who provided that content. A member can locate another member, e.g., based on descriptive information (e.g., name, location, title, job history, background, affiliations, and the like) and then immediately see the member's participation history. Preferably, a member's privileges and participation are controlled to ensure that he or she only has access to certain information and can participate in appropriate ways. This allows the enterprise to mix audiences into one community while still maintaining security and control.

Communities may implement an organizational construct called a "neighborhood," which is created and controlled by a community administrator. Users can create their own organizational construct called a "group." Neighborhoods are created by administrators and provide security features akin to those of a main community. The design and moderation is highly configurable and membership is controlled by a community administrator. The depth and appearance of the neighborhood also can be designed by administrators, making the community adaptable to any special initiatives the administrator may want to create. Neighborhoods are deployed for larger focuses such as knowledge sharing about specific product or marketing initiatives that have a specialized focus. A group is an organic gathering of users looking to converse and share information around a common topic they have interest in.

Figure 2:
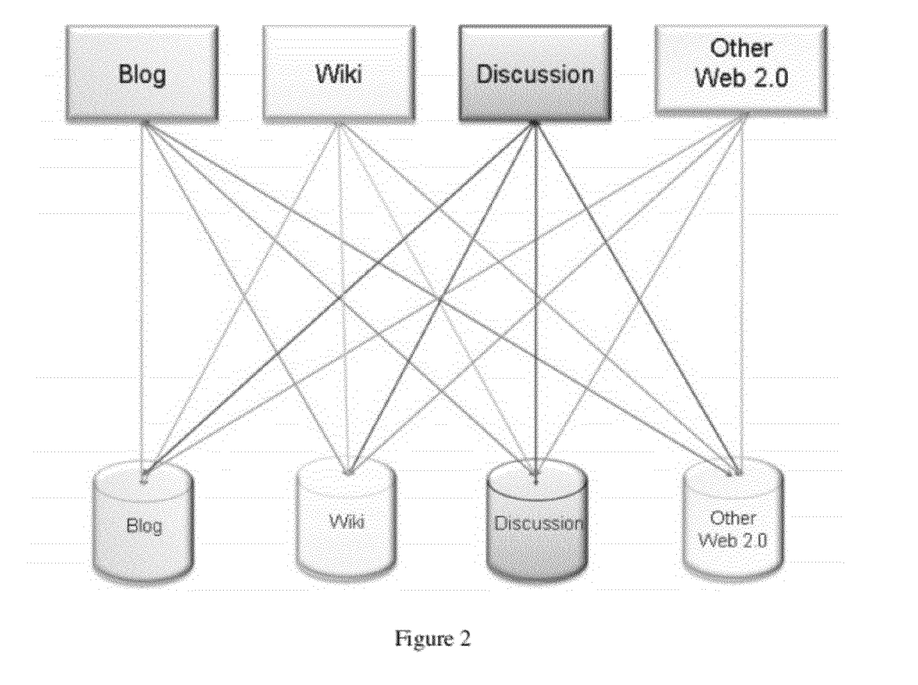
FIG. 2 illustrates a uniform content architecture that is implemented in the system.

Preferably, all content in a community is managed in the same way using a uniform content architecture. Unlike other offerings that use distinct tools for blogs, wikis, discussions, etc., the system preferably uses a single platform that gathers, organizes, and distributes content in a common, uniform architecture. FIG. 2 illustrates this general concept. In particular, in the uniform common architecture the actual content is saved and accessible in a generic manner (as content), and the system does not require that a specific content entry be associated with one and only one specific data entry or presentation format. In the platform, preferably all content is the same, whether it comes from a blog, a wiki, or a discussion forum. In this manner, the submitter need only select one or more presentation options for how other users should interact with the content. Once content is in the system, it is managed in the same uniform manner. Users do not have to switch between different tools for blogs, wikis, discussions, and the like. Those facilities preferably are seamlessly presented to users in a hosted community, and the content can freely flow from one to another. In this model, it is much easier for the user to find and contribute content. Moreover, regardless of whether the content is presented as a blog, a wiki, or any other presentation vehicle, members have common features, such as searching, tagging, mapping, voting, calendaring, and the like, that can be used across all of them, and administrators have common controls that span all content types for user management and content moderation.

To this end, the system preferably treats all submissions as "micro content." There does not need to be a separate destination for a blog post, or a wiki, or a calendar entry, or the like. Rather, preferably each piece of micro content can have any combination of a number of attributes applied to it that can make it appear in different locations as a different presentation. Representative micro content attributes include, by way of example only: individual blog, community submission, discussion, social bookmark, wiki, calendar, photo album, video post, podcast, microformat, and custom. An individual blog is a submission by an individual. Typically, by default every blog submission is stored with blog attributes (such as title, abstract, detail, etc.) including content submitted by completing web-based forms and email submissions. A community submission is a submission that includes an added community attribute by applying a community category (either manually or automatically) and that has the opportunity of being displayed in a community as part of category-based aggregations. A discussion is a submission that has applied to it a discussion attribute, which causes the content to show up in an individual's and/or community's discussion board area in a discussion forum presentation style. A social bookmark is a submission that has applied to it a social bookmarking attribute, which causes the author to be challenged for additional information such as a link and the content to be displayed in the that individual's bookmarks/clipping area and, when applicable, in a community's social bookmark area. A wiki is a submission that has applied to it a "wikify" attribute, which causes the content to be displayed in the individual's and/or a community's wiki area in a traditional wiki presentation style. A calendar is a submission that has applied to it a "calendar" attribute; submissions that have applied event attributes are challenged for additional information (e.g., start and end date/time), and the entry of this data causes the content to be displayed in the individual's and/or community's event calendar. A photo album is a submission with one or more images and that has a "photo album" attribute applied to it, which attribute causes the associated images to be displayed in the individual's and/or community's photo album. A video post is a submission with attached video and that has a "video" attribute applied to it, which causes the video to be displayed (e.g., in a Flash-based player) in the individual's and/or community's video area. A podcast is a submission that has applied to it a "podcast" (syndicate) attribute; the attached audio is automatically wrapped in enclosures and included in a podcast-specific RSS feed as well as displayed in a player in the individual's and/or community's podcast area. The system also supports other types of content submission such as "microformats," which are open data formats built upon existing and widely adopted standards. The system also enables users to create and solicit from authors custom attributes.

Figure 3:
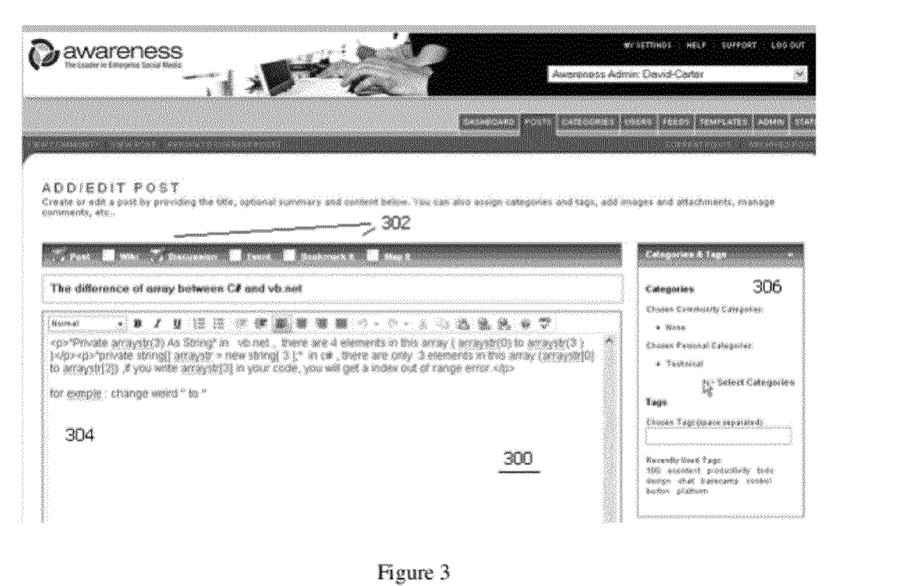
FIG. 3 illustrates how given content is a display interface for use by an end user to add/edit a content post.
Figure 4:
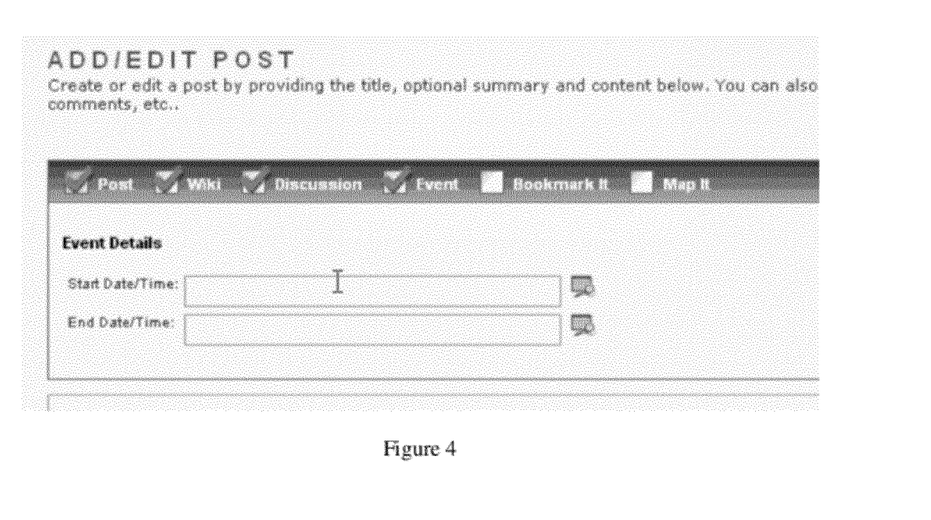
FIG. 4 illustrates how the display interface changes when the user selects an Event checkbox.
Figure 5:
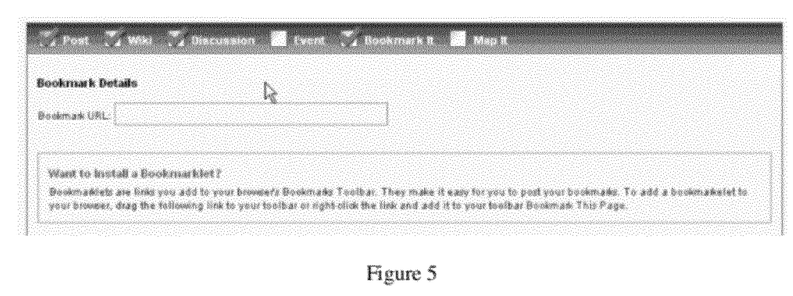
FIG. 5 illustrates how the display interface changes when the user selects a Bookmark checkbox.
Figure 6:
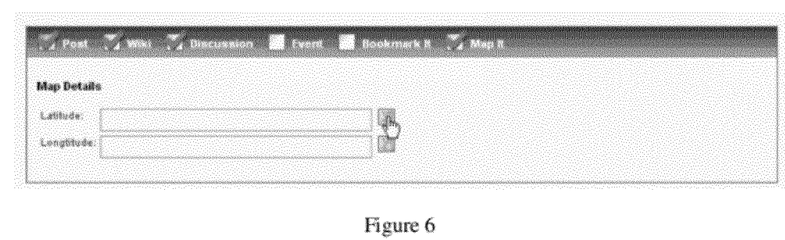
FIG. 6 illustrates how the display interface changes when the user selects a Map It checkbox.

Thus, in the system described herein any content can have attributes that make it appear as a blog post, user generated content in a community, a discussion forum topic, a wiki, an event, a photo album, a bookmark, or a map point. Indeed, a piece of content can be one or more of the above at the same time. Content aggregations can be set up to show a mix of content, or content can be filtered by modality, where a "mode" represents each attribute. Thus, for example, all wikis are a mode, all discussions are a mode, and so forth. FIG. 3 illustrates a Post display interface 300 by which an authorized user may create or edit a post. This interface is exposed by selected a Posts tab. In this embodiment, the display interface includes a set of checkboxes 302, one for each mode: Post, Wild, Discussion, Event, Bookmark and Map It. Selecting any one of these modes may challenge the user to enter additional data. Interface 300 includes a main text editor 304, and a Categories and Tags panel 306 may be used to assign categories and tags. Although not shown in detail, another sub-panel is used to add images and attachments, and still another sub-panel is used to add comments. By clicking one or more of the checkboxes 302 such as Post, Wiki and/or Discussion, the end user enters text in the editor and can generate a post, wiki or discussion forum entry. As noted above, some of the modes challenge the end user for more information. Thus, for example, FIG. 4 illustrates how the display interface changes when the user selects the Event checkbox. As can be seen, the display requests input of a start date/time and an end date and time. As another example, FIG. 5 illustrates how the display interface changes when the user selects the Bookmark checkbox. Here, the display provides a fill-in form for a URL that is then added to the user's bookmark. This operation is sometimes referred to as a bookmarklet. It is a submission form on a browser toolbar that allows a user to create a "bookmark" while browsing any site. FIG. 6 illustrates how the display interface changes when the user selects the Map It checkbox. This panel prompts the user to enter latitude and longitude data. The interface may also import a map from a third party data source (such as Google Maps). As can be seen, the display interface enables an end user to enter content in one of several modes, and given content may be associated with multiple modes at one time since the underlying content is maintained within the system generically.

Figure 7:
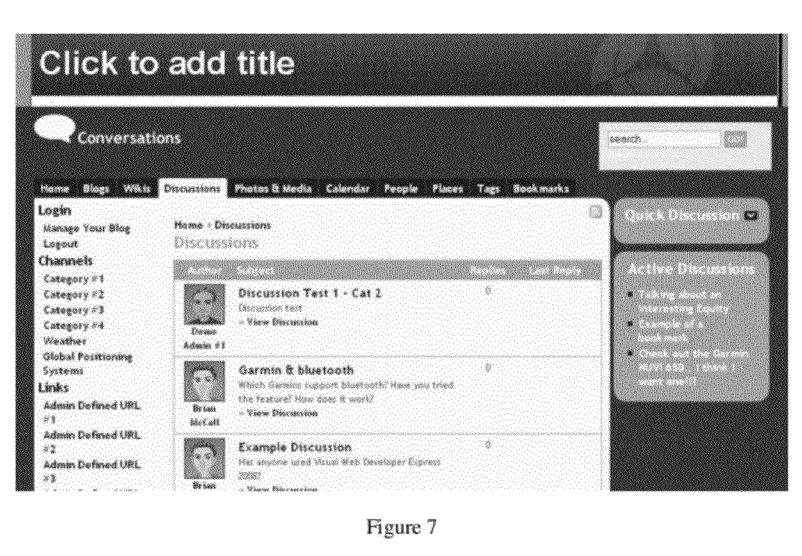
FIG. 7 illustrates a community site and, in particular, a discussion forum page.
Figure 8:
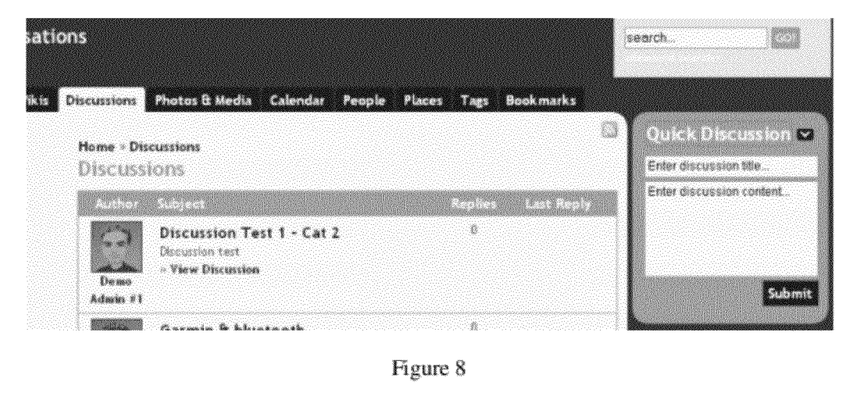
FIG. 8 illustrates how an end user can initiate a new discussion from the page shown in FIG. 7.
Figure 9:
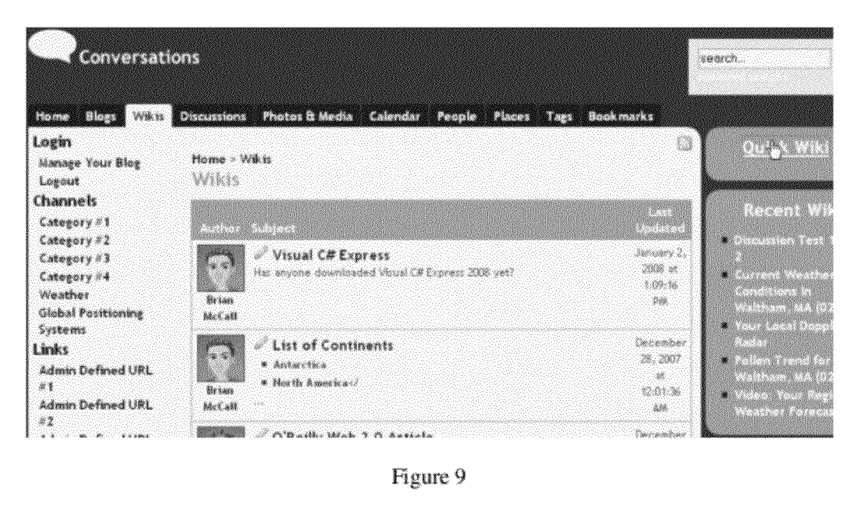
FIG. 9 illustrates the community site and, in particular, a wiki page.
Figure 10:
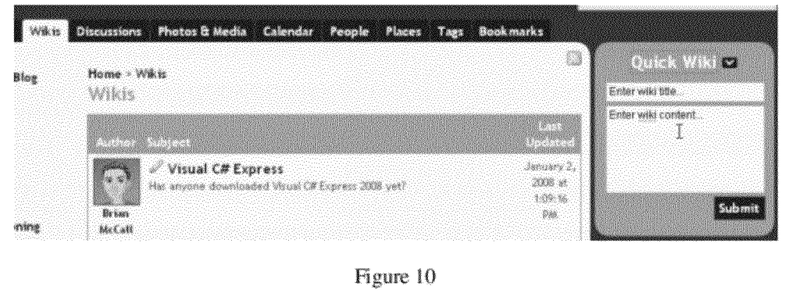
FIG. 10 illustrates how an end user can initiate a new wiki from the page shown in FIG. 9.
Figure 11:
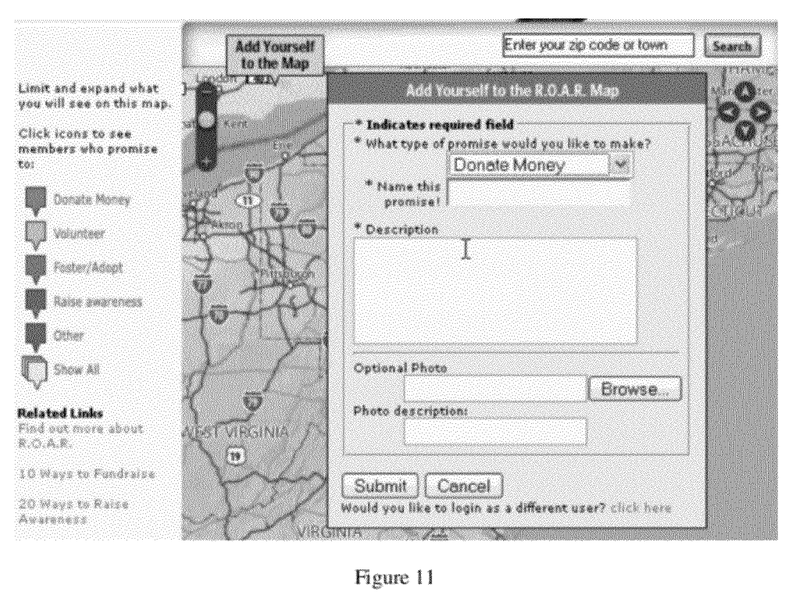
FIG. 11 illustrates a custom input form for a campaign-specific submission for a community.

The system also provides other convenient methods of content submission. Thus, for example, the system exposes a set of basic templates upon which context-specific forms are built. These forms inherent the current "mode" of the content (e.g. a post, a wiki, a discussion) and preferably offer a button or other input to "create a post," "create a discussion" etc. as the case may be. FIG. 7 illustrates a community, which is displayed as a set of web pages. This particular page (Conversations) shows a number of previously-generated discussion forums. By selecting the Quick Discussion panel, a fill-in form is exposed, such as shown in FIG. 8. The end user can then begin a new discussion on the fly. FIGS. 9-10 illustrate this process being initiated from the Wiki page. As an alternative to using the context-specific quick post, an end user can also build a form from scratch. This allows easy creation of a campaign-specific submission. FIG. 11 illustrates a custom input form for one such campaign-specific submission.

Figure 12:
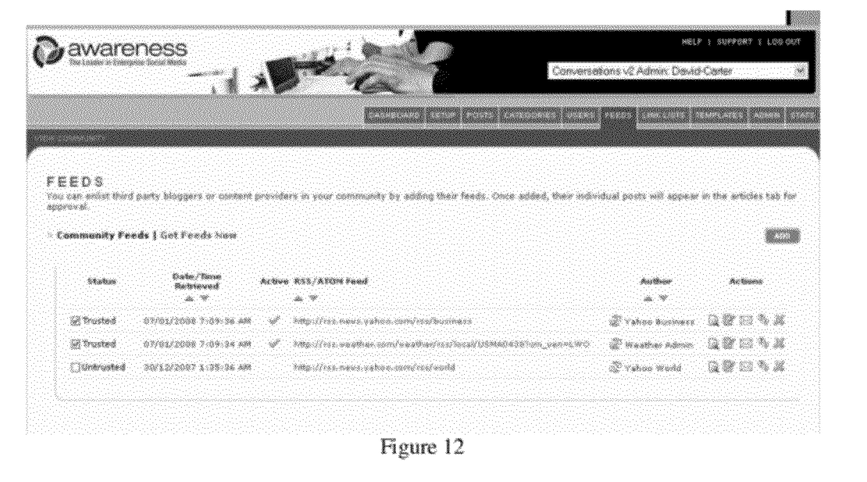
FIG. 12 illustrates an administrator display interface identifying a set of RSS feeds that have been provisioned.
Figure 13:
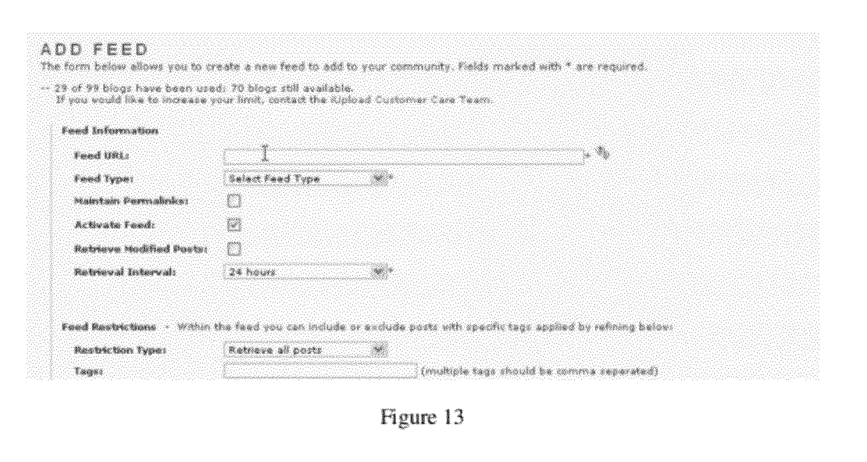
FIG. 13 illustrates how the RSS display changes when the user selects the Add button to add a new feed to the community.
Figure 14:
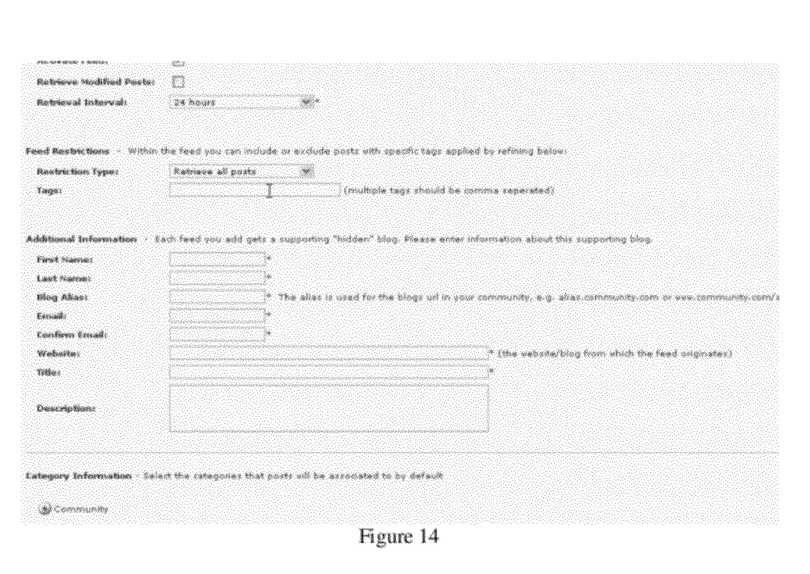
FIG. 14 illustrates the Add RSS feed display.
Figure 15:
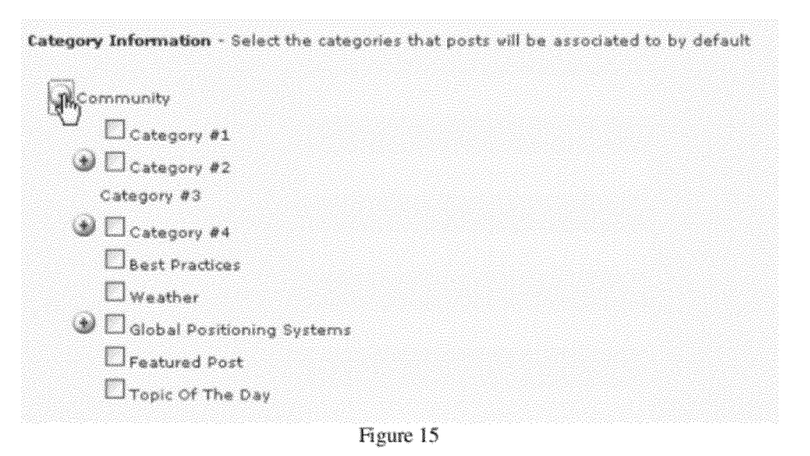
FIG. 15 illustrates the Add RSS feed display.

The platform also supports continuous monitoring and importing of RSS feeds. An RSS feed is assigned to an author and given permissions, which allows content to be moderated or pre-categorized. RSS content can be imported, or linked to source. FIG. 12 illustrates an administrator display interface identifying a set of RSS feeds that have been provisioned. FIG. 13 illustrates how the display changes when the user selects the Add button to add a new feed to the community. FIGS. 14-15 illustrate the solicitation of additional data for the RSS feed including feed restrictions, identification of an associated hidden blog, and the one or more community categories to which the feed will be associated.

Figure 16:
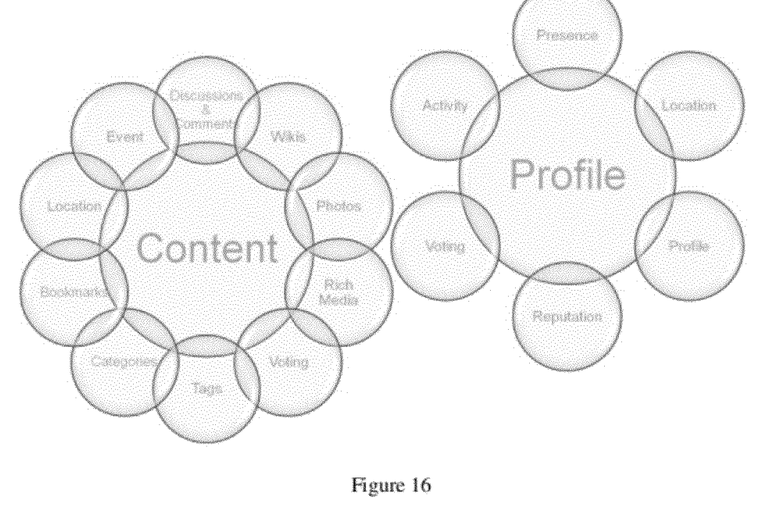
FIG. 16 illustrates how the system captures content and author data.
Figure 17:
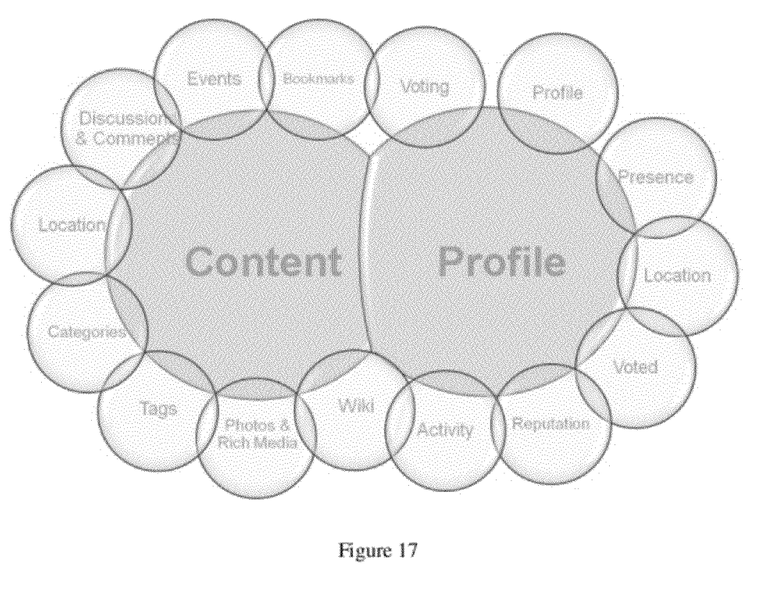
FIG. 17 illustrates how the system links content and author data.
Figure 18:
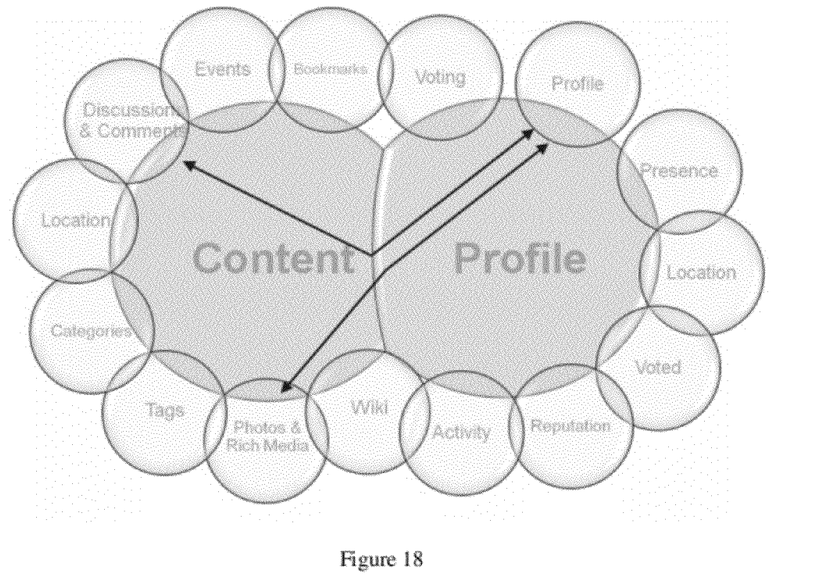
FIG. 18 illustrates how linked content and author data may be queried to generate a unique social aggregation data set.

As described above, preferably all content created or otherwise associated with a particular author is intrinsically tied or "linked" to the author via the author's profile. Thus, at each point of participation such as described and illustrated, the content is associated with the individual, which allows the system to build and maintain a rich "living" profile for each community member. Using this approach, the system can build and enable querying of so-called "social aggregations," which are data sets that describe a relationship among one or more author attributes and one or more content attributes. FIGS. 16-18 illustrates this concept. In FIG. 16, the content is shown as associated with multiple modes in the manner previously described. The figure also shows a rich profile that is identifies the user who submitted the content, and that profile also includes a set of profile attributes: activity, presence, location, profile, reputation and voting. FIG. 17 illustrates how the system links the author's profile to the content, and FIG. 18 illustrates how this linkage then enables querying of a social aggregation. Using the system API, content can be queried by author profile attributes to generate one or more social aggregations. As an example, a query for "all articles submitted by people who identify themselves as Republicans" would generate one social aggregation; a query for "all photos from people who live in Maine" would generate another such aggregation; a query for "discussions created by people who love the Red Sox" would generate still another such aggregation, and so on. Of course, the nature and scope of the social aggregations will then vary and depend only on the information captured in the profile and the content in the system.

Thus, according to the subject matter described herein, micro content and a user's profile are tied together. Every point of participation (whether it is expanding the user's own profile, votes that a user makes, comments or discussions that a user authors, the user's own bookmarks, his or her content contributions, and so on) preferably are tied to the user as an individual. This enables powerful social networking well beyond merely searching for users based on a profile field. As another example, the system would enable display of all the users in an organization who voted the same way on a particular voting question, or enable display into the social bookmarks of an individual who authored an article on the company's intranet that was particularly interesting. This linking of user profile data to content authoring allows the system to expose expertise in the community by letting users self-discover and collaborate with subject matter experts while letting groups/communities form on their own.

To this end, preferably the system captures data within each community pertaining to each member's participation. Preferably, all participation metrics are captured, meaning that community owners are able to track the categories around every participation point. The system enables community administrators to create rules/actions (such as approval rules) based on participation data. This data may be used to monitor overall trends of the community, or it might be used to build unique messaging or marketing campaigns to members specific to their areas of interest.

An application programming interface (API) may be used to enable an enterprise to implement and/or modify a community using the hosted service platform described above.

There are many ways in which the system 100 may be implemented, and the invention is not limited to any particular one. For purposes of illustration, the subject matter herein is shown as being implemented in a distributed computer environment within a given enterprise. As noted, the system may be implemented as a product or a service, or some combination thereof. A representative system in which the subject matter is implemented comprises any set of one or more computing resources including machines, processes, programs, functions, data structures, and the like. One or more of the machines typically are located behind an enterprise firewall. Of course, any other hardware, software, systems, devices and the like may be used. More generally, the subject matter may be implemented with any collection of autonomous or other computers (together with their associated software, systems, protocols and techniques) linked by a network or networks. In one representative embodiment, the system is deployed using Microsoft .NET technologies.

The subject matter herein provides numerous advantages. The hosted platform encourages broad participation from members of a Web-based hosted community regardless of the member's technical sophistication. Visitors and members can participate through: contributing to a blog, adding or editing wikis, completing a submission form, providing an email submission, providing a mobile-device submission (e.g., via SMS or MMS), by adding or editing a comment, by participating in a discussion forum, by voting or rating, or the like. Preferably, the platform is accessed using a web browser, so there is no client software-install required. Authors and others can access a particular online community at any time from a web browser. Content authors may create or edit their site without any programming knowledge using a simple word processing style editor. An author can preview a post to view content in context, seeing exactly how the information will look when it goes live. Using a simple interface, users may schedule content publishing and archiving to take place automatically. Content may be published immediately or saved as a draft for future publication. Preferably, user profiles are customizable and contain a rich set of information. This feature allows users to share personal information, and to search for others based on their profile data. Users can store and share URLs to websites and pages to create a resource library. When creating content, users can associate posts with specific keywords (tags). When searching for content, a user can see a list of tags, select one, and then view all content tagged with that word. Tag clouds can also be used to show a list of tags, with their popularity indicated by font size. Using the above-described API, users can add geographic context to content. This allows a specific location to be added to a piece of content. With this feature, users can type in addresses, select maps or key in geographic data (latitude and longitude) coordinates to tag a post. A geo-RSS feed and map then shows the location of each geo-tagged post created.

As previously noted, the hardware and software systems in which the invention is illustrated are merely representative. The invention may be practiced, typically in software, on one or more machines. Generalizing, a machine typically comprises commodity hardware and software, storage (e.g., disks, disk arrays, and the like) and memory (RAM, ROM, and the like). The particular machines used in the system are not a limitation of the present invention. A given machine includes network interfaces and software to connect the machine to a network in the usual manner. As described above, the subject matter may be implemented as a standalone product, or as a managed service (e.g., in an ASP model) using a set of machines, which are connected or connectable to one or more networks. More generally, the product or service is provided using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., AJAX technologies, Java applets or servlets, linkable libraries, native code, or the like, depending on platform), that provide the functionality of a given system or subsystem. As described, the product or service may be implemented in a standalone server, or across a distributed set of machines. Typically, a server connects to the publicly-routable Internet, a corporate intranet, a private network, or any combination thereof, depending on the desired implementation environment.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill will appreciate that some of the functions may be combined or shared in given instructions, program sequences, code portions, and the like.

The invention claimed is:

1. Software as a service (SaaS) apparatus, comprising:
an Internet-accessible infrastructure comprising one or more servers, and a database;
a server of the one or more servers receiving and storing in the database user-generated micro-content associated with at least one of a plurality of content modes identified by a content author;
a server of the one or more servers storing the user-generated micro-content in the database as generic content irrespective of the content mode identified by the content author such that the user-generated content may be re-purposed and output in at least one content mode that differs from the content mode identified by the content author;
the database maintaining an association between the content author and the user- generated content; and
an application programming interface (API) responsive to a query that includes one or more author profile attributes, that provides a response data set that enforces associations that have been maintained between the content author and the user-generated content;
the response data set being a social aggregation that describes a relationship among one or more author profile attributes and one or more content attributes.

2. The apparatus as described in claim 1 wherein the content mode is one of: a blog, a wiki, a discussion group, a social network, a podcast, an RSS feed, a content tag, a photo album, and a map.

3. The apparatus as described in claim 1 wherein a server of the one or more servers receives the user-generated micro-content using a posting interface.

4. The apparatus as described in claim 1 including a security mechanism to enforce an enterprise-specific security restriction on an online community.

5. The apparatus as described in claim 4 wherein the online community is associated with a particular enterprise.

6. The apparatus as described in claim 1 wherein the one or more servers includes one of: a web server, and an application server.

* * * * *